(12) United States Patent
Sadiku

(10) Patent No.: US 6,477,762 B1
(45) Date of Patent: Nov. 12, 2002

(54) METHOD AND DEVICE FOR PRODUCING A WAVE WINDING FOR STATORS OR ROTORS OF ELECTRIC ENGINES

(75) Inventor: Sadik Sadiku, Neuberg (DE)

(73) Assignee: Elmotec Statomat Vertriebs GmbH (DE)

( * ) Notice: Subject to any disclaimer, the term of this patent is extended or adjusted under 35 U.S.C. 154(b) by 0 days.

(21) Appl. No.: 09/646,047
(22) PCT Filed: Dec. 22, 1999
(86) PCT No.: PCT/EP99/10265
§ 371 (c)(1), (2), (4) Date: Sep. 13, 2000
(87) PCT Pub. No.: WO00/42697
PCT Pub. Date: Jul. 20, 2000

(30) Foreign Application Priority Data

Jan. 13, 1999 (DE) .......................... 199 00 922

(51) Int. Cl.⁷ ............................................. H02K 15/00
(52) U.S. Cl. ...................................... 29/596; 242/432.6
(58) Field of Search .................... 29/596, 597, 598, 29/732, 735; 242/432.6, 437

(56) References Cited

U.S. PATENT DOCUMENTS 3,787,000 A * 1/1974 Farnsworth et al.
3,791,419 A * 2/1974 Arick et al.
5,406,987 A * 4/1995 Gassner et al.
5,490,318 A   2/1996 Kleinschmidt
5,492,154 A * 2/1996 Napierski
5,609,187 A * 3/1997 Hachisuka et al.

FOREIGN PATENT DOCUMENTS

EP        0 818 874       1/1998
WO       WO99/13555       3/1999

* cited by examiner

Primary Examiner—David P. Bryant
Assistant Examiner—Stephen Kenny
(74) Attorney, Agent, or Firm—Larson & Taylor, PLC

(57) ABSTRACT

In the described device a wire (18), which is fed in by a wire guide (20), is wound on a shaping body (10) provided with recesses (16), of a rotatably driveable template (10, 12) and, in the course of the rotation of the latter, is cyclically pushed into the recesses (16) by radially movable outer shaping elements (12). Subsequently the wave-shaped wire windings are transferred into longitudinal slits of a coil receiver (34), which is positioned axially in front of the shaping body (10) and is essentially maintained fixed against relative rotation during the winding movement. In order to obtain complete wave windings over the circumference in a simple manner, it is provided that the shaping of the end of the last winding of a wave winding is finished in the allocated recess (16) by means of an additional inward movement of at least one of the shaping elements (12) in a different angle of rotation position of the template (10, 12) than during the cyclically performed shaping movement.

8 Claims, 2 Drawing Sheets

Figure 1:
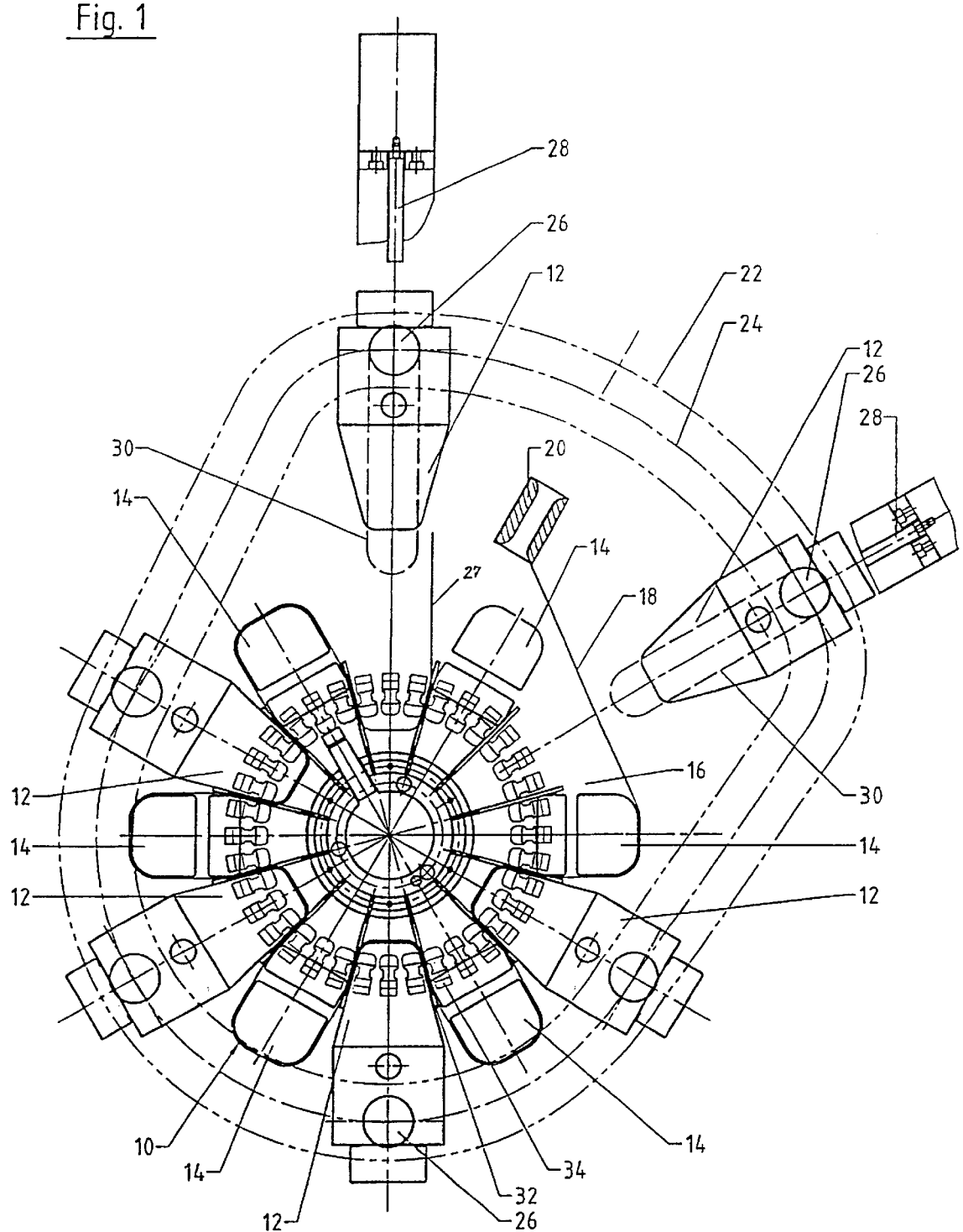

METHOD AND DEVICE FOR PRODUCING A WAVE WINDING FOR STATORS OR ROTORS OF ELECTRIC ENGINES

The invention relates to a method and a device for producing a wave winding for stators or rotors of electric machines, wherein at least one winding wire, which is fed in by a wire guide, is wound on a shaping body designed with recesses of a template, which can be rotatingly driven, is cyclically pressed into the respectively allocated recesses in the course of the creation of each winding of the wave winding by means of radially movably guided exterior shaping elements of the template as a function of its angle of rotation position, and thereafter the windings are transferred into longitudinal slits of a coil receiver, which can be positioned axially in front of the shaping body and is held, fixed against relative rotation, or performs a positioning movement during the creation of the windings, which are wound without breaks in the wire.

A device by means of which the above mentioned method can be executed is described in DE 43 06 624 C2. There the procedure is such that a first wave winding is produced on a template, is cut off from the wire supply and is stripped off onto the coil receiver, then a further wave winding is produced in the same way, is cut off and is stripped off onto the coil receiver after the latter has performed a rotating indexing movement, etc. In this case the coil receiver merely needs to perform positioning movements, preferably only rotating indexing movements, but in individual cases possibly also translatory movements. It need not be driven synchronously with the template, as is the case in connection with winding methods on which a further winding is produced without a break in the wire on a rotating template following the winding and stripping off of simplex or wave windings, such as, for example, in accordance with EP 0 574 841 A1, WO 98/25444 and the proposal in German Patent Application 197 39 353.5. It is practical to operate with coil receivers without a synchronous drive mechanism, for example if, to achieve short production times and using a single draw-in device, the wave windings, which are to be switched in series, are produced in a parallel operation on different templates, are then transferred to the same coil receiver and are thereafter drawn into the stator or rotor, such as in accordance with EP 0 818 874 A1, for example, wherein, however, the winding wire is not formed continuously in a wave shape during the winding process, but all of the coils are pulled together into a wave winding only after the termination of the winding process.

The method in accordance with DE 43 96 624 C2, which is practiced with an indexing coil receiver which, however, cannot be driven synchronously with the template, so far has had the disadvantage that, for producing a wave winding with a defined number of windings, it is necessary, depending on the size and cross section, after an appropriate number of rotations to rotate the template still further in varying amounts past the initial position, because the end of the last winding is only shaped in the finished form by the cyclically moved shaping element acting in the last circumferential area after it has passed through the respectively initial or base position.

The object of the invention directed toward avoiding this shortcoming is attained in respect to the method in that the shaping of the end of the last winding of the wave winding is finished by at least one shaping element close to the wire guide in the allocated recess, wherein the latter shaping element is moved radially inward in addition to the cyclically performed shaping movement. The additional inward movement takes place in a different angle of rotation position of the template than with the cyclically performed shaping movement.

The device for executing this method is characterized in claim 6.

It is achieved by means of the invention that the control of winding devices, wherein the wave windings produced on a rotatingly driven template are cut off from the wire supply following the winding process respectively prior to or after being stripped off onto a coil receiver, is simplified, and the winding and retooling times can be shortened. This is of particular importance in connection with winding devices with several parallel operating, rotatingly driven templates, wherein a short cycling time of a draw-in device connected downstream of the winding device, by means of which the wave windings collected on the coil receiver are drawn into the grooves of a stator or rotor, is given preference over continuous wire connections between successively produced wave windings.

Figure 2:
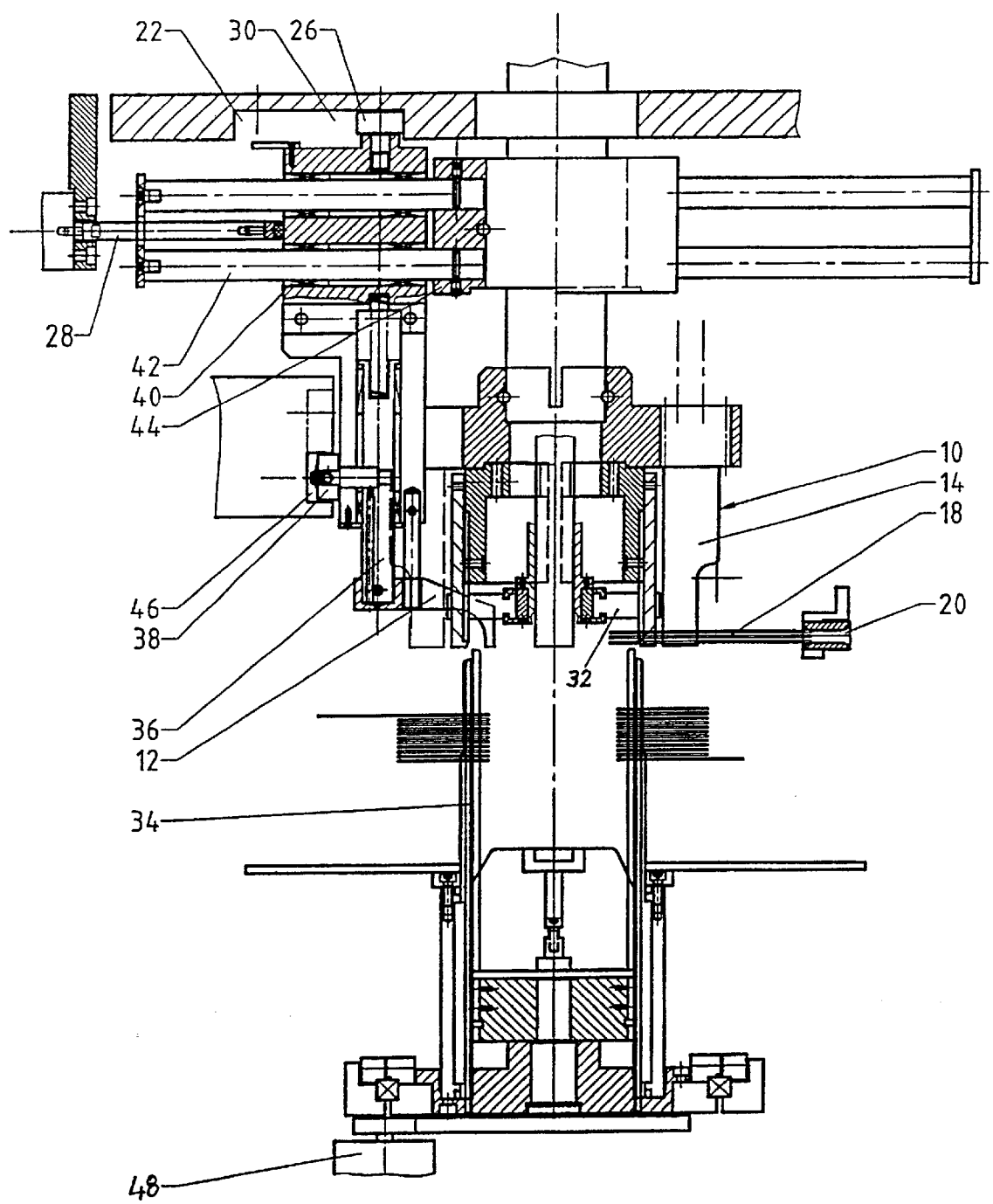

An exemplary embodiment of the invention will be explained in greater detail in what follows by means of the drawings. Shown are in:

FIG. 1, a simplified view from above on a winding device for producing a wave winding, FIG. 2, a vertical cross section through the device in accordance with FIG. 1.

Since the basic design of the device represented in FIGS. 1 and 2 is known from DE 43 06 624 C2, the following description can be limited to the essential details.

The view from above in FIG. 1 shows a winding template with an inner shaping body 10 and outer shaping elements 12. In the case of the example, the shaping body 12 is composed of six winding cheeks 14, which are evenly distributed over the circumference. The spaces between the cheeks 14 form recesses 16 in the shaping body 10, into which the shaping elements 12 can enter, coming radially from the outside. Corresponding to the number of six cheeks 14 in the example, six outer shaping elements 12 are also provided.

To produce a wave winding on the shaping body 10, the template 10, 12 is rotated around the vertical center longitudinal axis in the center of the arrangement of the winding cheeks 14, while a winding wire, or preferably several parallel winding wires 18 are fed in through a wire guide 20 in the form of a wire nozzle, for example, arranged laterally next to the shaping body 10. The wire 18 is clamped in place on one of the winding cheeks 14 at the start of the winding process and is therefore taken along by the rotating shaping body 10 and is pulled off through the wire nozzle 20 from a supply of wire. The wave shape of the winding is produced in that, in the course of each revolution of the shaping body 10, the outer shaping elements 12 rotating along with it sequentially and cyclically enter the recess 16 which happens to pass the wire guide 20, and in the process pull the length of wire required for shaping the wave out of the wire guide 20 in addition to the length of wire pulled off by the rotation of the shaping body 10.

In the exemplary embodiment, the drive for moving the outer shaping elements 12 is derived from the rotary movement of the template 10, 12. A stationary curved track 22 is provided for this purpose, whose centerline is identified by 24. The curved track 22 extends in the form of a semicircle around approximately half the circumference of the shaping body 10, which semicircle lies diametrically opposite the wire guide 20 in respect to the axis of rotation. On its side the curved track 22 forms an arc which is farther away from the axis of rotation, which with comparatively small radii makes a transition on both sides into approximately straight connecting sections, which follow the semicircular section essentially tangentially.

By means of the above described shape of the curved track 22, which is closed on itself and represented in FIG. 1, into which rollers 26 connected with the shaping elements 12 enter, it is achieved that the outer shaping elements 12 are radially pulled back toward the outside when they approach the wire guide 20 during each rotation of the template and, as soon as they have passed the wire guide 20, they very rapidly radially move back into the respectively allocated recess 16 and remain in their radial end position until they again approach the wire guide 20 during the rotation of the template. In this way the outer shaping elements 12 perform a cyclical radial inward and outward moving motion during every rotation of the template, with a holding phase in the radially inner end position extending approximately over half the circumference.

Let us assume that the template is represented in the end position following the winding of a wave winding with a defined number of windings of parallel wires, wherein the beginning of the coil is identified by 27. The end position in which the template is stopped coincides with the initial position which it had assumed at the start of the winding process. Thus the template has performed exactly as many rotations in the course of the winding process as the number of windings the wave winding is intended to have. As can be determined by the position of the winding wire 18 between the wire guide 20 and the shaping body 10, the template has turned in a clockwise direction in accordance with FIG. 1 during the winding process. It can also be seen from FIG. 1 that the last winding of the winding wire 18 could not be formed in a wave-shape, instead it extends from the cheek 14, which is already approximately 60° behind the wire guide 20, tangentially in a straight line across the recess 16, which also has already passed the wire guide 20, to the latter. In order to also shape this end of the last winding of the wave winding into a wave, the template 10, 12 would have to again turn over approximately 60°, starting from the position in FIG. 1. On this path of rotation the radially outward pulled shaping element 12 would have entered into the recess 16, which in FIG. 1 is bridged by the straight wire section 18, and in the process would have shaped the wire, but one sixth of the wire length of a wave-shaped winding would have additionally been pulled out of the wire guide 20. If the additional rotating movement over approximately 60° were not performed, the last winding of the wave winding would remain incomplete.

It is understood that the radial entry of the one shaping element 12 which shapes the end section of the last wound winding in a wave shape need not absolutely take place during the stop in the initial position of the template. The end position can differ from the initial position within a tolerable angle range of, for example, up to 30°, or a drive mechanism, which can be effective during the rotating movement of the template, can be selected for the special radial movement of the one shaping element 12.

In order to avoid an additional rotating movement past the initial position at the end of each winding process, and thereby to achieve a simplification of the control process, it is provided in connection with the represented winding position that at least one of the two shaping elements 12 which, in the initial position represented, have been pulled radially outward by the curved track 22, can be pushed forward into its radial inner end position by an additional drive mechanism 28 along a radially extending branch 30 of the circular curved track 22. In the course of this, the not yet deformed straight wire section 18 is pushed into the recess 16 of the shaping body 10, which it had bridged.

Of the two shaping elements 12 which have been radially pulled outward in the initial position, respectively only the one which had just passed the wire guide 20 during the previous winding process needs to be pushed inward along the radial branch 30 of the curved track 22. During a rotation in a counterclockwise direction this would be the shaping element 12 shown to the left of the wire guide 22 in accordance with FIG. 1. However, preferably both shaping elements 12, which had been pulled back radially outward, are simultaneously pushed radially inward, so that the produced wave winding dependably rests in the recesses 16 against the shaping body 10 over the entire circumference, and can also be dependably stripped off the template 10, 12 axially out of this position by means of strippers 32 and transferred into the axial slits of a receiver 34. The wire 19 is cut at the wire guide 20 by means of a cutting device, not represented, prior to or after being stripped off. Immediately following the stripping-off process, the fresh start of a wire can be pushed forward out of the wire guide 20 toward the cheek 14 which, in the initial position shown, is located directly in front of it and on which a wire gripper is seated, and can be clamped, so that the next winding process can start immediately thereafter. In this case the control of the drive mechanism of the template can be very simply embodied, because it always stops in the initial position, so that only the direction of rotation and the number of windings need to be set.

Since the principle of the invention has already been explained by means of FIG. 1, reference is made to FIG. 2 for describing structural details of the preferred embodiment. Only one cheek 14 of the shaping body 10 and, located opposite it, only one outer shaping element 12 are represented. The latter is fastened on a support element 36, which is connected with a guide roller 38 and is attached, displaceable in the vertical direction, on a carriage 40. The latter slides on radially extending guide rails 42, which are seated radially on the inside on a support bushing 44. The respective guide roller 26 is attached to the carriage 40.

When the template 10, 20 is in the initial position represented in FIG. 1, each of the shaping elements 12 has a quite definite angle of rotation position. This also applies to the two shaping elements 12, which have been pulled back radially outward. Thus, in their initial position it is possible to respectively arrange an additional drive mechanism, for example in the form of a pneumatic actuating cylinder with a piston rod 28, radially outside of the respective carriage 40. After the template 10, 12 has been stopped in its initial position following the winding process, the respective piston rod 28 moves radially forward toward the interior and snaps with its front end into a suitable coupling on the carriage 40, which it then takes along into its radially inner end position, in which the shaping element 12 supported by the respective carriage 40 has been completely moved into the allocated recess 16. Before the next winding process after this starts, the piston rod 28 is again pulled back radially outward by its pneumatic cylinder and in the process takes the carriage 40, which is connected with it by means of a releasable snap connection, with it along the radial branch 30 of the curved track 22. Once the carriage 40 has reached its outer end position, the snap connection is released by means of the continued pull of the piston rod 28, so that the carriage 40 is completely released from the piston rod 28 and can be revolvingly guided along the ring-shaped curved track 22 during the subsequent winding process, while the two additional, only radially acting carriage drive mechanisms 28 remain at their respective position on the circumference of the curved track 22.

Since in the course of the winding process the shaping elements 12 mainly revolve on the level of the winding wire 18 fed in by the wire guide 20, during each revolution they are not only pulled back radially by the curved track 22 as far as outside of the envelope circle of the shaping body 10, but are also lifted up ahead of the wire guide 20 and lowered again when past it in order not to collide with it, by means of a further curved track 46, which works together with the guide rollers 38.

After a wave winding has been produced on the shaping body 10 with the aid of the outer shaping elements 12, the shaping body 10, together with the wire guide 20, is lowered sufficiently far so that the shaping body 10 and the receiver 34 come into axial engagement. Thereafter the stripper 32 is actuated, which pushes the wave winding off the shaping body 10 into the slits of the receiver 34. Subsequently the shaping body 10, the wire guide 20 and the stripper 32 move upward again, so that the shaping body 10 is released from the receiver 34 and the next rotating movement can start, while the receiver 34 remains stationary or only performs a positioning movement, for example, makes an indexing movement by means of a motor 48. During the winding process the receiver 34, together with the wave winding transferred to it, can also be conveyed on to a draw-in station, for example, and can be replaced by another, empty receiver 34.

In the embodiment described by way of example, the receiver 34 does not need to have any rotary drive mechanism except for the indexing motor 48, i.e. it needs neither to be driven synchronously with the template 10, 12 by its own motor drive mechanism, nor coupled with it for being taken along by it. Because the template is separate from the receiver 34 during the winding process, and since the wire is also cut after each winding process, the receiver 34 can perform any arbitrary positioning movements during winding, i.e. it can be indexed or transported. The receiver 34 preferably is a draw-in tool, which has parallel laminations arranged in a ring shape, between which one or several wave windings are suspended in the position underneath the template 10, 12. Thereafter, a stator, for example, is placed on the laminations in a known manner in a draw-in station, and then the wave windings are axially drawn into its grooves.

To obtain a single layer of windings on the shaping body 10 without overlying windings, the template usefully performs an axial movement in relation to the wire guide 20, wherein in the case of winding parallel wires the axial advance per revolution approximately corresponds to the sum of the diameters of the parallel wires. The shaping body 19 must be designed to have the appropriately length.

What is claimed is:

1. A method for producing a wave winding for stators or rotors of electric machines, wherein at least one winding wire (18), which is fed in by a wire guide (20), is wound on a shaping body (10) designed with recesses (16) of a template (10, 12), which can be rotatingly driven, and is cyclically pressed into the respectively allocated recesses (16) in the course of the creation of each winding of the wave winding by means of radially movably guided exterior shaping elements (12) of the template as a function of its angle of rotation position, and thereafter the windings are transferred into longitudinal slits of a coil receiver (34), which can be positioned axially in front of the shaping body (10) and is held, fixed against relative rotation, or performs a positioning movement during the creation of the windings, wound without breaks in the wire, characterized in that the shaping of the end of the last winding of the wave winding is finished by at least one shaping element (12) close to the wire guide (20) in the allocated recess (16), wherein the latter shaping element (12) is moved radially inward in addition to the cyclically performed shaping movement.

2. The method in accordance with claim 1, characterized in that at the end of a winding process the template (10, 12) stops in the same angle of rotation position which it had assumed at the start of the winding process, and that then the end of the last winding of the produced wave winding is pushed into the allocated recess (16) by a radially inward moved shaping element (12) and is shaped.

3. The method in accordance with claim 2, characterized in that after the stop of the rotating movement of the template (10, 12), the wave winding is also pushed into the allocated recess (16) by the radial inward movement of the shaping element (12) which, during the rotating movement, had followed the shaping element (12) which shapes the winding end.

4. The method in accordance with claim 1, characterized in that one or several wires, lying parallel next to each other in one layer, are wound on the shaping body (10) in the manner of a screw spring, in that the shaping body performs an axial advancing movement during the rotating movement, and at the end of the winding process are located between the shaping body (10) and the wire guide (20) on a plane extending parallel in relation to the axis of rotation of the shaping body (10).

5. A device for executing the method in accordance with claim 1, having a template (10, 12), which can be rotatingly driven, located in front of a wire guide (20), comprising a shaping body (10), which is designed to correspond to the inner diameter of the wave winding to be produced and is equipped with recesses (16), and radially movable outer shaping elements (12), each of which can be sequentially and cyclically moved into and out of the respectively allocated recess (16) in the course of each revolution of the template (10, 12) depending on its angle of rotation positions, and having a coil receiver (34), which is provided with axial slits and can be axially positioned in front of the shaping body (10) and, during the respective rotating movement of the template (10, 12), is held fixed against relative rotation or performs a positioning movement, characterized in that at the end of the revolution of the template (10, 12), performed for producing the last winding of a wave winding, and subsequent to the cyclic insertion and removal movement, at least one shaping element (12), which is close to the wire guide (20), can be moved into the radially inner end position in the allocated recess (16) of the shaping body (10).

6. The device in accordance with claim 5, characterized in that the cyclic radial movement of the shaping elements (12) is derived from the rotating movement of the template (10, 12) by a stationary ring-shaped curved track (22), and that at the end of the rotating movement of the template (10, 12) the shaping element (12), which shapes the end of the last winding of the wave winding, can be moved radially inward along a branch (30) of the curved track (22) by means of an additional drive mechanism (28).

7. The device in accordance with claim 6, characterized in that at the end of a winding process the template (10, 12) can be stopped in the same angle of rotation position which it had assumed at the start of the winding process, and the shaping element (12), which had directly followed the shaping element (12) which had shaped the end of the wave winding during the winding process, can be moved radially inward along a branch (30) of the curved track (22) by means of an additional drive mechanism (28) at the end of the rotating movement of the template (10, 12).

8. The device in accordance claim 5, characterized in that the wire guide (20) is designed with individual guides for several parallel wires (18), which can be simultaneously wound in single layers on the shaping body (10), while during each revolution the latter performs an axial advance in relation to the wire guide (20) which corresponds to the sum of the wire diameters.

\* \* \* \* \*